US009628637B2

(12) United States Patent
Ohshita et al.

(10) Patent No.: US 9,628,637 B2
(45) Date of Patent: Apr. 18, 2017

(54) INFORMATION PROCESSING SYSTEM, IMAGE FORMING APPARATUS, AND COMPUTER PROGRAM PRODUCT CONFIGURED TO COMBINE PERSONAL INFORMATION WITH DOCUMENT IMAGE

(71) Applicants: Takaaki Ohshita, Tokyo (JP); Yutaka Nakamura, Kanagawa (JP)

(72) Inventors: Takaaki Ohshita, Tokyo (JP); Yutaka Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/827,541

(22) Filed: Aug. 17, 2015

(65) Prior Publication Data
US 2016/0050324 A1 Feb. 18, 2016

(30) Foreign Application Priority Data

Aug. 18, 2014 (JP) .................................. 2014-166187

(51) Int. Cl.
  *H04N 1/00* (2006.01)
  *G06F 17/24* (2006.01)
  (Continued)

(52) U.S. Cl.
  CPC ....... *H04N 1/00108* (2013.01); *G06F 17/243* (2013.01); *G06F 17/30879* (2013.01); *H04N 1/04* (2013.01)

(58) Field of Classification Search
  None
  See application file for complete search history.

(56) References Cited

U.S. PATENT DOCUMENTS

2007/0192335 A1  8/2007  Sugiura et al.
2013/0134213 A1*  5/2013  Pallakoff ................ G06Q 30/00
                                                    235/375
(Continued)

FOREIGN PATENT DOCUMENTS

JP        07-220023       8/1995
JP        2005-038205     2/2005
(Continued)

*Primary Examiner* — Thomas D Lee
(74) *Attorney, Agent, or Firm* — Cooper & Dunham LLP

(57) ABSTRACT

The system includes a terminal apparatus and an image forming apparatus that comprises: a communication unit that performs near field wireless communication; a communication controller that controls the communication unit so as to receive document identification information for identifying a document and personal information to be input to the document transmitted from the terminal apparatus through near field wireless communication; a storage unit that stores document identification information for identifying a document, document image information, and entry position information of entries in association with each other for each document; and an information combining unit that searches the storage unit for the document image information and the entry position information stored in association with the same document identification information as the received document identification information and generates a combined image in which the received personal information is combined at a position on a document image indicated by the entry position information.

8 Claims, 15 Drawing Sheets

(51) Int. Cl.
*H04N 1/04* (2006.01)
*G06F 17/30* (2006.01)

(56) References Cited

U.S. PATENT DOCUMENTS

| | | | | |
|---|---|---|---|---|
| 2014/0248853 A1* | 9/2014 | Shipley | ............... | H04W 12/06 |
| | | | | 455/411 |
| 2015/0029532 A1* | 1/2015 | Lee | ...................... | G06F 3/1238 |
| | | | | 358/1.14 |
| 2015/0205777 A1* | 7/2015 | Campanelli | ........ | G06K 9/00442 |
| | | | | 715/226 |

FOREIGN PATENT DOCUMENTS

| JP | 2007-208391 | 8/2007 |
|---|---|---|
| JP | 2014-021621 | 2/2014 |

\* cited by examiner

INFORMATION PROCESSING SYSTEM, IMAGE FORMING APPARATUS, AND COMPUTER PROGRAM PRODUCT CONFIGURED TO COMBINE PERSONAL INFORMATION WITH DOCUMENT IMAGE

CROSS-REFERENCE TO RELATED APPLICATIONS

The present application claims priority to and incorporates by reference the entire contents of Japanese Patent Application No. 2014-166187 filed in Japan on Aug. 18, 2014.

BACKGROUND OF THE INVENTION

1. Field of the Invention

The present invention relates to an information processing system, an image forming apparatus, and a computer program product.

2. Description of the Related Art

Nowadays, input support apparatuses are known that display an outer frame, entry columns, and the like of a document read by a scanner apparatus on a display unit and cause a user to enter necessary items into the displayed entry columns or the like using a keyboard or the like, thereby enabling the document into which the necessary items are entered to be printed. Using this input support apparatus can save time and trouble to enter necessary items into documents by handwriting.

Although conventional input support apparatuses can save time and trouble to enter necessary items into documents by handwriting, it is necessary to input necessary items by operating a keyboard instead. Consequently, the situation remains the same in that analog input work such as "entering by handwriting" and "entering by operating a keyboard" is necessary, and both cases have the problem that a certain time is required for creating documents. In addition, the operation on a keyboard is a heavy burden on users who are unskilled in the operation.

In view of the above problems, there is a need to provide an information processing system, an image forming apparatus, and a computer program product that can more efficiently create a document into which necessary information is input.

SUMMARY OF THE INVENTION

It is an object of the present invention to at least partially solve the problems in the conventional technology.

According to the present invention, there is provided an information processing system comprising a first apparatus and a second apparatus, the first apparatus comprising: a first communication unit that performs communication; a document identification information acquisition unit that acquires document identification information for identifying a document via the first communication unit; a personal information acquisition unit that acquires personal information stored in a storage medium via the first communication unit; and a first communication controller that controls the first communication unit so as to transmit the document identification information and the personal information, and the second apparatus comprising: a second communication unit that performs communication; a second communication controller that controls the second communication unit so as to receive the document identification information and the personal information transmitted from the first apparatus; a storage unit that stores therein document identification information for identifying a document, document image information, and entry position information of entries in association with each other for each document, and an information combining unit that searches the storage unit for the document image information and the entry position information stored in association with the same document identification information as the received document identification information and generates a combined image in which the received personal information is combined at a position on a document image indicated by the entry position information.

The present invention also provides an image forming apparatus comprising: a communication unit that performs near field wireless communication; a communication controller that controls the communication unit so as to receive document identification information for identifying a document and personal information to be input to the document transmitted from a terminal apparatus through near field wireless communication; a storage unit that stores therein document identification information for identifying a document, document image information, and entry position information of entries in association with each other for each document; and an information combining unit that searches the storage unit for the document image information and the entry position information stored in association with the same document identification information as the received document identification information and generates a combined image in which the received personal information is combined at a position on a document image indicated by the entry position information.

The present invention also provides a computer program product comprising a non-transitory computer-readable recording medium having an information processing program that causes a computer to function as: a communication controller that controls a communication unit that performs near field wireless communication so as to receive document identification information for identifying a document and personal information to be input to the document transmitted from a terminal apparatus through near field wireless communication; and an information combining unit that, by referring to a storage unit that stores therein document identification information for identifying a document, document image information, and entry position information of entries in association with each other for each document with the received document identification information, searches for the document image information and the entry position information stored in association with the same document identification information as the received document identification information and generates a combined image in which the received personal information is combined at a position on a document image indicated by the entry position information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
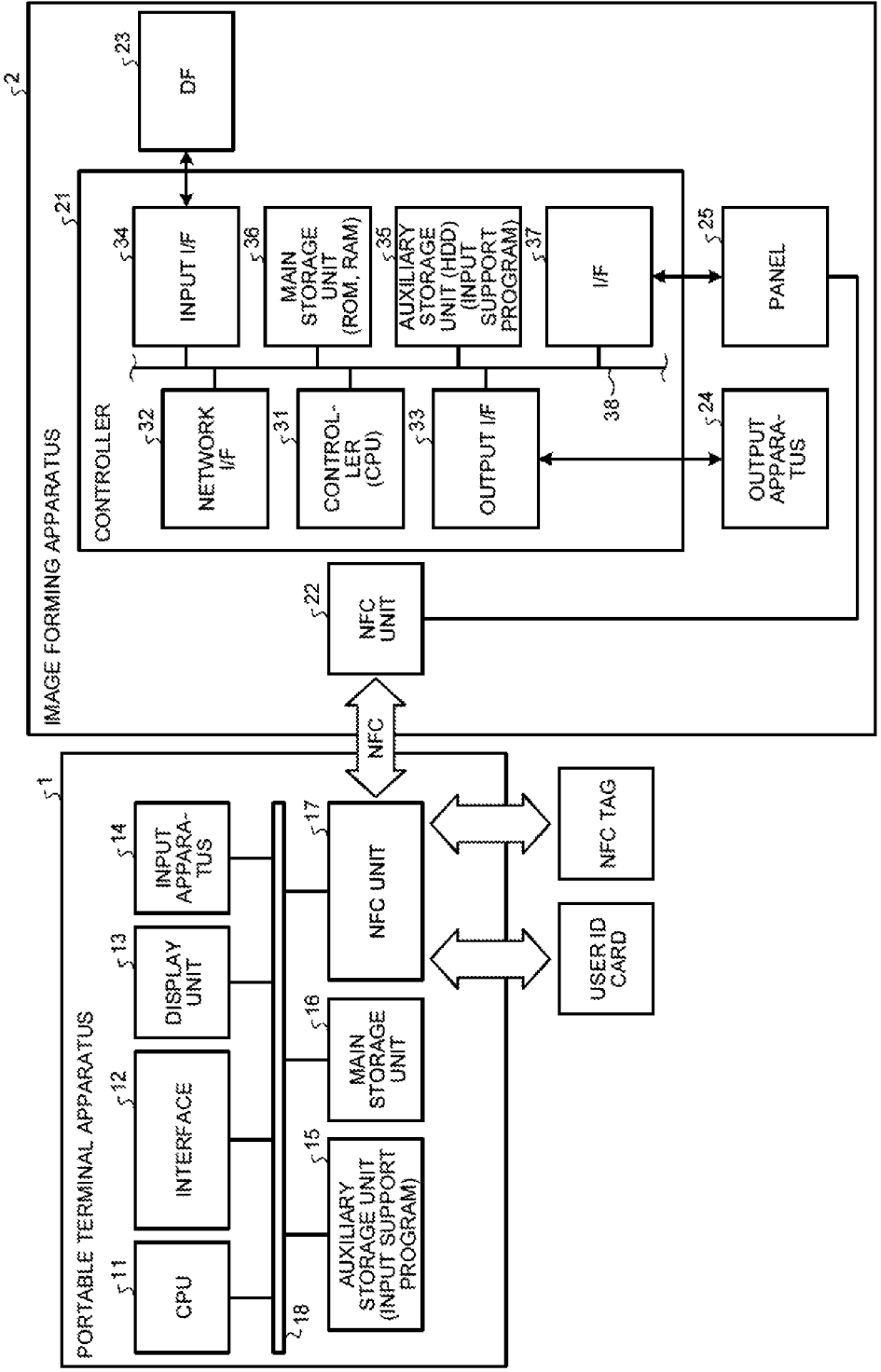
FIG. 1 is a system configuration diagram of an input support system of an embodiment of the present invention.

The following describes an input support system of an embodiment to which an information processing system, an image forming apparatus, and a computer program product according to the present invention are applied in detail with reference to the attached drawings. First, FIG. 1 illustrates a system configuration diagram of the input support system of the embodiment. As illustrated in FIG. 1, the input support system of the embodiment includes a portable terminal apparatus 1 and an image forming apparatus 2.

The portable terminal apparatus 1 can be a portable apparatus such as a cellular phone, a smartphone, a notebook personal computer, and a portable game machine. Although this example will be described on the condition that the input support system includes the portable terminal apparatus 1, a non-portable apparatus such as a desktop personal computer, for example, may be used in place of the portable terminal apparatus 1.

The portable terminal apparatus 1 includes a CPU 11, an interface (I/F) 12, a display unit 13, an input apparatus 14, an auxiliary storage unit 15, a main storage unit 16, and an NFC unit 17. The CPU 11 through the NFC unit 17 are connected to each other via a bus line 18.

The CPU 11 controls operation of the entire portable terminal apparatus 1 in accordance with an operation system program and various kinds of application programs. The display unit 13 is, for example, a liquid crystal display unit. The input apparatus 14 is, for example, a touch sensor having a transparent electrode. The display unit 13 and the input apparatus 14 are integrally configured to provide what is called a touch panel.

The auxiliary storage unit 15 can be a hard disk drive (HDD) device. The auxiliary storage unit 15 stores therein an input support program for the portable terminal apparatus 1. The CPU 11 controls the units in accordance with the input support program, thereby performing input support control described below. The input support program for the portable terminal apparatus 1 may be recorded and provided in a computer-readable recording medium such as a CD-ROM and a flexible disk (FD) as an installable or executable file. The input support program may be recorded and provided in a computer-readable recording medium such as a CD-R, a DVD, a Blu-Ray Disc®, and a semiconductor memory. The DVD is an abbreviation for a digital versatile disc. The input support program may be provided by being installed via a network such as the Internet. The input support program may be embedded and provided in a ROM or the like in the apparatus.

The main storage unit 16 can be a ROM or a RAM. The ROM is an abbreviation for a "read only memory." The RAM is an abbreviation for a "random access memory." The NFC (near field communication) unit 17 is an example of a first communication unit and is a near field wireless communication unit that performs data communication in a short range of ten-odd centimeters. The NFC unit uses a radio wave of 13.56 MHz to perform interactive communication with 100 to 400 Kbps in a short range of about 10 centimeters, although that is an example. The following description will be given on the condition that the NFC unit is used as the near field wireless communication unit. However, it is not limited to the NFC unit of the NFC communication standard, a near field wireless communication unit such as Bluetooth (registered trademark) and an infrared unit may be used.

Next, the image forming apparatus 2 can be, for example, a multifunction peripheral (MFP). The MFP is an electronic apparatus having one or two or more pieces of functionality among, for example, printing functionality, copying functionality, scanner functionality, and facsimile functionality. Other than the MFP, an electronic apparatus having printing functionality and NFC communication functionality can be used.

The MFP includes a controller 21, an NFC unit 22, a document feeder (DF) 23, an output apparatus 24, and a panel 25. The NFC unit 22 is an example of a second communication unit and performs the near field wireless communication with the NFC unit 17 or the like of the portable terminal apparatus 1. The document feeder (DF) 23 automatically feeds sheets for printing.

The output apparatus 24 is a piece of hardware that performs general-purpose information processing and processing other than communication for implementing copying functionality, scanner functionality, facsimile functionality, and printing functionality. The output apparatus 24 includes, for example, a scanner (an image reading unit) that scans and reads a document image, a plotter (an image forming unit) that performs printing on a sheet material such as a sheet, and a fax unit that performs fax communication. The output apparatus 24 may include a finisher that sorts printed sheets and the document feeder (DF) 23.

The panel 25 is, as an example, what is called a touch panel having a touch sensor including a transparent electrode and a liquid crystal display unit. The panel 25 can be attached and detached to and from the image forming apparatus 2. The panel 25 displays a selection menu, operating buttons, and the like on the liquid crystal display unit and transmits a command corresponding to a position on which a user has performed a touch operation to the controller 21. The panel 25, when it is attached to the image forming apparatus 2, performs communication in a wired manner with the controller 21 via terminals and a cable. The panel 25, when it is separate from the image forming apparatus 2, performs wireless communication with the controller 21 through wireless communication functionality such as Bluetooth (registered trademark), infrared communication, and radio frequency (RF) communication. The NFC unit 22 may be externally attached to the panel 25. The NFC unit 22 may be incorporated into the panel 25.

The controller 21 includes a controller (CPU) 31, a network interface (network I/F) 32, an output I/F 33, an input I/F 34, an auxiliary storage unit 35, a main storage unit 36, and an interface (I/F) 37. The CPU 31 through the interface 37 are connected to each other via a bus line 38.

The network I/F 32 connects the image forming apparatus 2 to an external network such as the Internet. The output I/F 33 connects the output apparatus 24 having copying functionality, scanner functionality, fax functionality, printer functionality, or the like and the controller 21. The input I/F 34 connects the document feeder (DF) 23 and the controller 21. The auxiliary storage unit 35 can be a hard disk drive (HDD) device. The auxiliary storage unit 35 stores therein an input support program for the image forming apparatus 2. The CPU 31 controls the units in accordance with an operation system program and various kinds of application programs and controls the units in accordance with the input support program, thereby performing input support control described below.

The input support program for the image forming apparatus 2 may be recorded and provided in a computer-readable recording medium such as a CD-ROM and a flexible disk (FD) as an installable or executable file. The input support program may be recorded and provided in a computer-readable recording medium such as a CD-R, a DVD, a Blu-ray Disc®, and a semiconductor memory. The DVD is an abbreviation for a digital versatile disc. The input support program may be provided by being installed via a network such as the Internet. The input support program may be embedded and provided in a ROM or the like in the apparatus.

The main storage unit 36 can be a ROM and a RAM. The interface 37 connects the panel 25 attached to the image forming apparatus 2 to the controller 21 in a wired manner.

Figure 2:
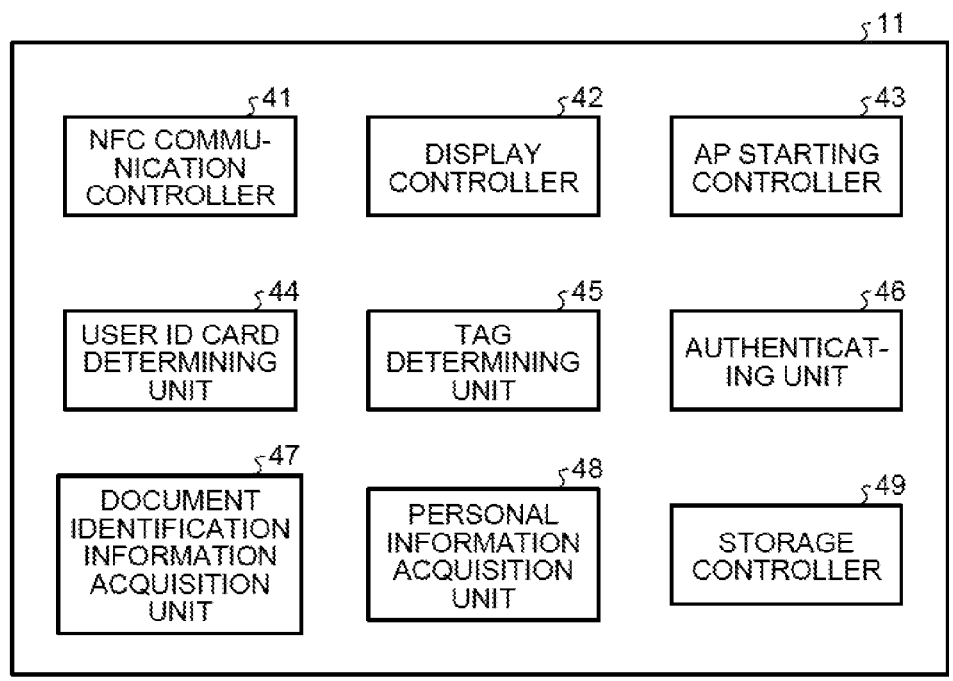
FIG. 2 is a functional block diagram of a portable terminal apparatus provided in the input support system of the embodiment.

FIG. 2 illustrates a functional block diagram of functions implemented by the CPU 11 of the portable terminal apparatus 1 operating in accordance with the input support program for the portable terminal apparatus 1 stored in the auxiliary storage unit 15. As illustrated in FIG. 2, the CPU 11 functions as an NFC communication controller 41, a display controller 42, an application program (AP) starting controller 43, a user ID card determining unit 44, a tag determining unit 45, an authenticating unit 46, a document identification information acquisition unit 47, a personal information acquisition unit 48, and a storage controller 49. Although this example will be described on the condition that the NFC communication controller 41 through the storage controller 49 are implemented by the input support program for the portable terminal apparatus 1 in a software manner, part of or whole thereof may be implemented by hardware.

The NFC communication controller 41 is an example of a first communication controller and controls the NFC unit 17 so as to perform the near field wireless communication with the NFC unit 22 of the image forming apparatus 2. The display controller 42 displays, on the display unit 13, operating messages to a user, operating keys for inputting a personal identification number, and the like. The AP starting controller 43 reads and starts the input support program stored in the auxiliary storage unit 15. The user ID card determining unit 44 determines a user ID card in which user's personal information is stored such as in an IC (integrated circuit) chip-incorporated driver's license.

The tag determining unit 45 determines an IC tag attached to a document for which input support is performed. The authenticating unit 46 compares a personal identification number input by the user to a personal identification number stored in the user ID card to perform user authentication. The document identification information acquisition unit 47 acquires information for identifying a document type from the IC tag attached to the document for which input support is performed. The personal information acquisition unit 48 acquires personal information such as an address, a full name, and the date of birth stored in the user ID card. The storage controller 49 once stores the document identification information acquired by the document identification information acquisition unit 47 and the personal information acquired by the personal information acquisition unit 48 in the main storage unit 16.

Figure 3:
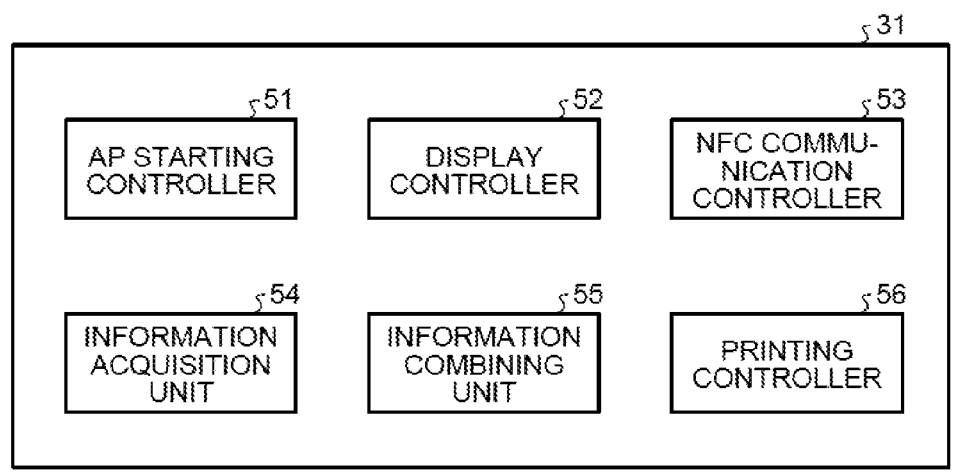
FIG. 3 is a functional block diagram of an image forming apparatus provided in the input support system of the embodiment.

FIG. 3 illustrates a functional block diagram of functions implemented by the CPU 31 of the image forming apparatus 2 operating in accordance with the input support program for the image forming apparatus 2 stored in the auxiliary storage unit 35. As illustrated in FIG. 3, the CPU 31 functions as an application program (AP) starting controller 51, a display controller 52, an NFC communication controller 53, an information acquisition unit 54, an information combining unit 55, and a printing controller 56. Although this example will be described on the condition that the AP starting controller 51 through the printing controller 56 are implemented by the input support program for the image forming apparatus 2 in a software manner, part of or whole thereof may be implemented by hardware.

The AP starting controller 51 reads and starts the input support program stored in the auxiliary storage unit 35. The display controller 52 displays operating messages to the user, a document image into which the personal information is input (combined), and the like on the panel 25. The NFC communication controller 53 is an example of a second communication controller and controls the near field wireless communication between the NFC unit 22 and the NFC unit 17 of the portable terminal apparatus 1. The information acquisition unit 54 acquires the document identification information and the personal information sent from the portable terminal apparatus 1. The information combining unit 55 forms an image in which pieces of personal information are input into respective corresponding columns on the document. The printing controller 56 performs printing control on the document in which the pieces of personal information are input via the output apparatus 24.

Figure 4:
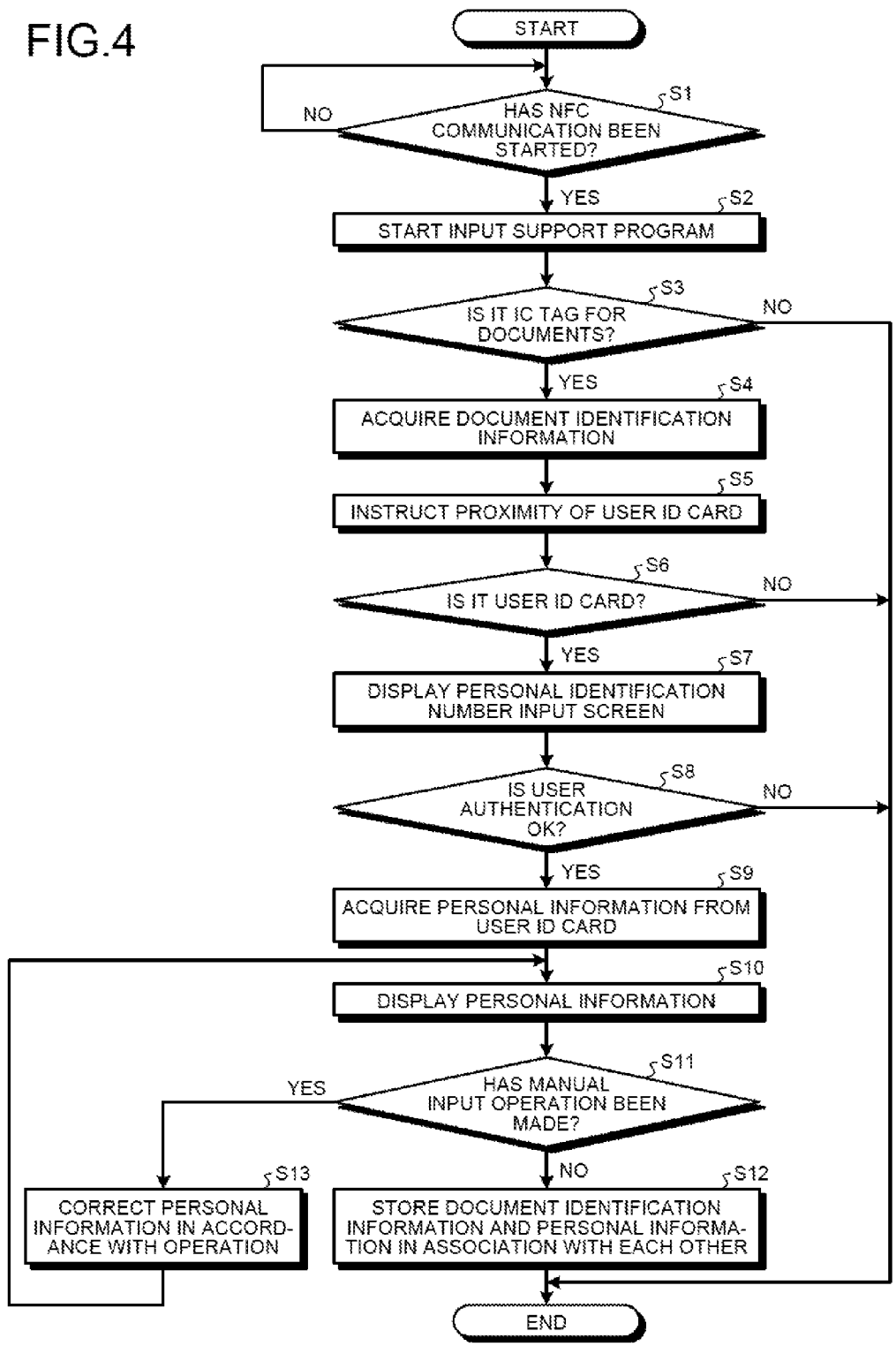
FIG. 4 is a flowchart for illustrating input support operation of the portable terminal apparatus provided in the input support system of the embodiment.
Figure 5:
FIG. 5 is a diagram for illustrating an IC tag provided on a document.

Next, the flowchart in FIG. 4 illustrates a procedure of input support operation of the portable terminal apparatus 1. As in the example illustrated in FIG. 5, an information storage medium such as an IC tag 61 is attached to the document. The IC tag 61 is an example of a communication storage medium and stores therein document identification information for identifying a document. The document identification information is information for identifying the document type such as a notification of moving out, a notification of change of address, a notification of opening of business, and a notification of birth and is provided with ID to be stored in the IC tag 61.

The IC tag 61 may store therein information on respective entries such as an address, a full name, and the date of birth, information on the number of pages, information on entry positions of the respective entries, and image information of the entire document while being contained in the document identification information. The information on the entry positions of the respective entries can be designated through the xy coordinates of the upper left corner of a rectangular entry column and the xy coordinates of the lower right corner of the entry column.

This example will be described on the condition that the IC tag 61 stores therein the document identification information, the information on the respective entries, and the like. However, even other than the IC tag 61, any information storage medium that can record necessary information may be used.

The auxiliary storage unit 35 of the image forming apparatus 2 is an example of a storage unit, in which a document database is generated as described below. The document database stores therein layout information (the information on entries, the information on the number of pages, and the information on the entry positions of the respective entries) and document image information in association with the document identification information for each document. The CPU 31 of the image forming apparatus 2 acquires the layout information and the document image information associated with the document identification information acquired through the near field wireless communication from the auxiliary storage unit 35.

By storing the layout information and the image information in the auxiliary storage unit 35 in association with the document identification information, the amount of the information stored in the IC tag 61 can be reduced. In addition, an information amount of the information transmitted between the portable terminal apparatus 1 and the image forming apparatus 2 through the near field wireless communication can be reduced, and a communication time can be reduced.

In contrast, storing the layout information and the image information in the IC tag 61 while being contained in the document identification information can prevent a storage area of the auxiliary storage unit 35 of the image forming apparatus 2 from being pressed by the document identification information. In addition, this storing can omit time and trouble to collect pieces of document identification information of respective documents in advance and construct the document database in the auxiliary storage unit 35 by the image forming apparatus 2.

The user brings the portable terminal apparatus 1 into proximity to the IC tag 61 of the document. On the IC tag 61 side, an antenna of the IC tag 61 receives the radio wave from the NFC unit 17 of the portable terminal apparatus 1, thereby generating electric power by electromagnetic induction. With this configuration, the near field wireless communication between the portable terminal apparatus 1 and the IC tag 61 is enabled. The NFC communication controller 41 illustrated in FIG. 2 determines whether or not the IC tag 61 has been excited and the near field wireless communication has been enabled to start at Step S1 in the flowchart in FIG. 4. If it is determined that a communication connection has been established between the portable terminal apparatus 1 and the IC tag 61 and that the near field wireless communication has been enabled to start (Yes at Step S1), the process advances to Step S2.

At Step S2, the AP starting controller 43 reads the input support program for the portable terminal apparatus 1 from the auxiliary storage unit 15 and starts the program. The CPU 11 then operates in accordance with the input support program, thereby implementing the units 41 through 49 illustrated in FIG. 2. Specifically, at Step S3, the tag determining unit 45 determines whether or not the IC tag 61 that is currently performing the near field wireless communication is an IC tag for documents from information transmitted and received with the IC tag 61 at the establishment of a communication line. If it is determined by the tag determining unit 45 that the IC tag 61 that is currently performing the near field wireless communication is not the IC tag for documents (No at Step S3), the processing of the flowchart in FIG. 4 ends without any further operation.

In contrast, if it is determined by the tag determining unit 45 that the IC tag 61 that is currently performing the near field wireless communication is the IC tag for documents (Yes at Step S3), the process advances to Step S4. At Step S4, the document identification information acquisition unit 47 acquires from the IC tag 61 the document identification information for identifying the document type such as a notification of moving out, a notification of change of address, a notification of opening of business, and a notification of birth. At Step S5, the display controller 42 controls the display unit 13 to display an instruction to bring the user ID card into proximity together with the acquired document identification information.

Figure 6:
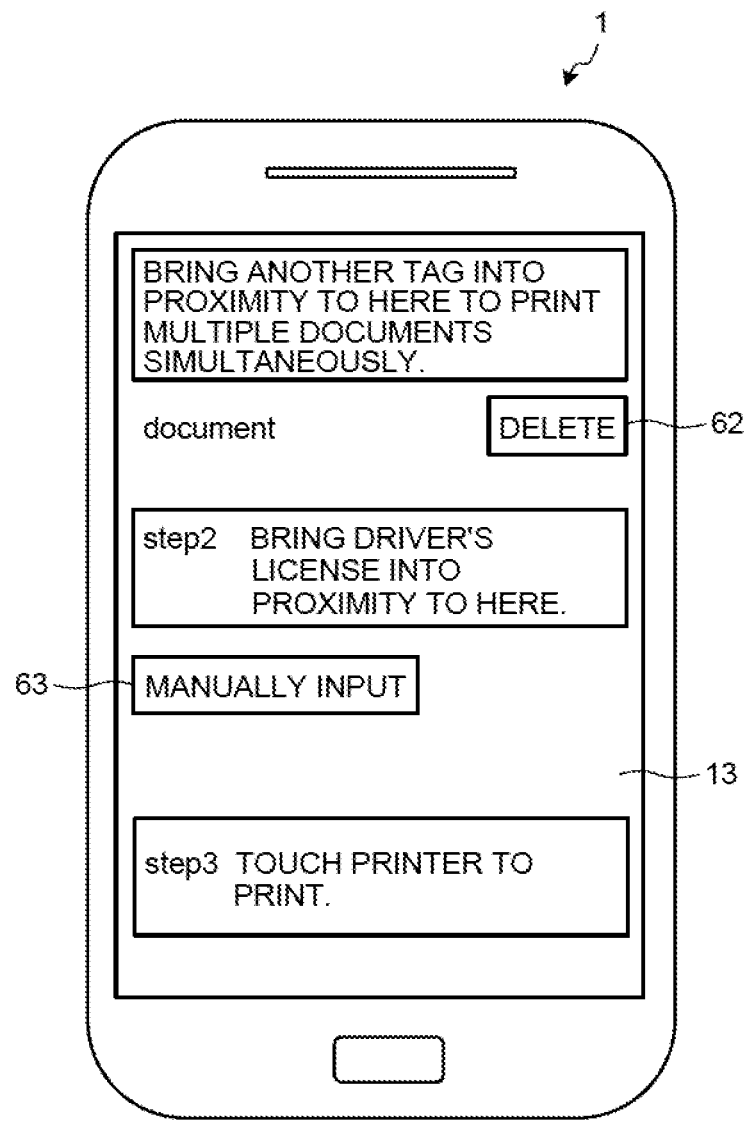
FIG. 6 is a diagram illustrating how document identification information is acquired from an IC tag of a document and displayed by the portable terminal apparatus provided in the input support system of the embodiment.

FIG. 6 illustrates an example of a display screen for the document identification information and the instruction of proximity of the user ID card. The example illustrated in FIG. 6 is an example in which the document identification information of "document" stored in the IC tag 61 is acquired. The display controller 42 displays a deletion instruction button 62 for instructing the deletion of the acquired document identification information together with the acquired document identification information of "document." When the user sees the displayed document identification information and determines that it is unnecessary, the user operates the deletion instruction button 62. When the deletion instruction button 62 is operated, the display controller 42 hides (deletes) the document identification information of "document" that is currently displayed from the display unit 13. When the user desires to display the document identification information of "document" again on the display unit 13, the user brings the portable terminal apparatus 1 into proximity to the IC tag 61 again. With this operation, the document identification information of "document" is acquired from the IC tag 61 again through the near field wireless communication as described above and is displayed on the display unit 13.

The example illustrated in FIG. 6 illustrates an example of the instruction of proximity of the user ID card when the user ID card is the IC card driver's license. In this case, the display controller 42 displays a message such as "Bring driver's license into proximity to here." to prompt the user to bring the IC card driver's license into proximity to the portable terminal apparatus 1, although that is an example. The user ID card is preferably a storage medium storing therein personal information such as an address, a full name, and the date of birth and a personal identification number. The IC card driver's license stores therein two personal identification numbers and personal information such as an address, a full name, and the date of birth.

Figure 7:
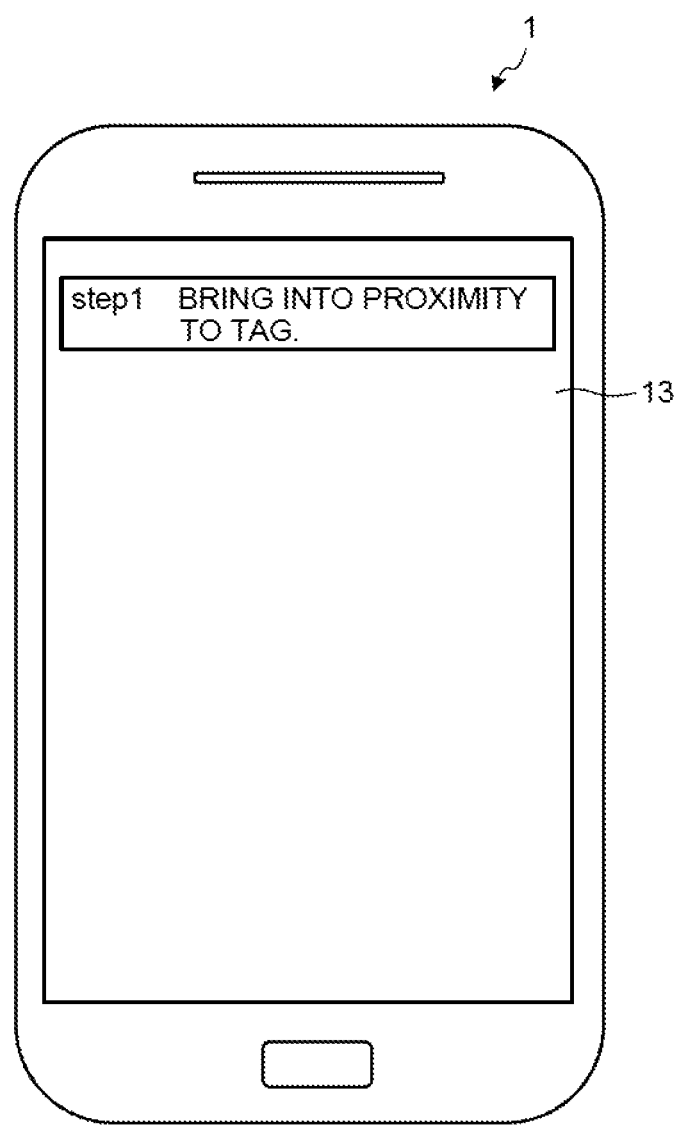
FIG. 7 is a diagram illustrating an example of an initial screen when an input support program is manually started in the portable terminal apparatus provided in the input support system of the embodiment.

The foregoing description is an example in which when the user brings the portable terminal apparatus 1 into proximity to the IC tag 61, the input support program is automatically started, and as illustrated in FIG. 6, the document identification information acquired from the IC tag 61 and the instruction of proximity of the user ID card are displayed on the display unit 13. However, the user may manually start the input support program. In this case, the user selects the input support program from an application program selection menu and performs starting operation. When the starting operation is detected, the AP starting controller 43 starts the input support program. In accordance with the input support program, as illustrated in FIG. 7, for example, the display controller 42 displays a message to prompt the proximity of the portable terminal apparatus 1 to the IC tag 61 such as "Bring into proximity to tag." on the display unit 13. The user sees this message and brings the portable terminal apparatus 1 into proximity to the IC tag 61 of the document. With this operation, the near field wireless communication is performed between the portable terminal apparatus 1 and the IC tag 61, and as illustrated in FIG. 6, the document identification information stored in the IC tag 61 is acquired and is displayed on the display unit 13 together with the instruction of proximity of the user ID card.

Next, when the user brings the portable terminal apparatus 1 into proximity to the user ID card in accordance with the message to prompt the proximity of the user ID card, at Step S6, the user ID card determining unit 44 determines whether or not the user ID card stores therein personal information such as an address and a full name and functions as an ID card. If it is determined by the user ID card determining unit 44 that the user ID card does not function as an ID card (No at Step S6), the processing of the flowchart in FIG. 4 ends without any further operation. If it is determined that the user ID card does not function as an ID card, a message such as "Bring another user ID card into proximity to here." may be displayed to prompt for the use of another user ID card.

Figure 8:
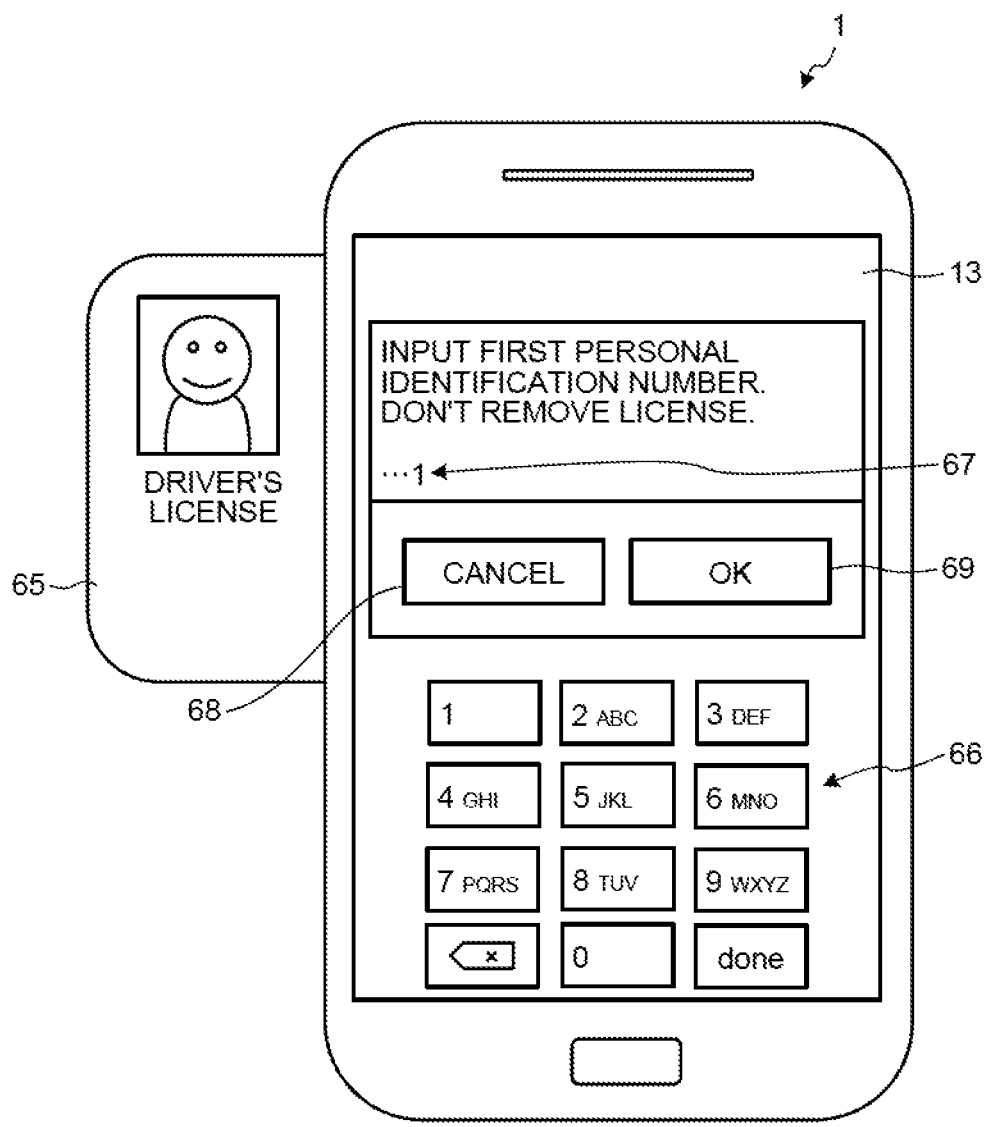
FIG. 8 is a diagram illustrating an input screen for a personal identification number of a user ID card in the portable terminal apparatus provided in the input support system of the embodiment.

If it is determined by the user ID card determining unit 44 that the user ID card functions as an ID card (Yes at Step S6), the process advances to Step S7. At Step S7, the display controller 42 displays a personal identification number input screen as exemplified in FIG. 8 on the display unit 13. Specifically, as illustrated in FIG. 8, the display controller 42 displays a message on input of a personal identification number and maintaining a state in which the portable terminal apparatus 1 is brought into proximity to the user ID card such as "Input first personal identification number. Don't remove license." The display controller 42 displays operating keys 66 including numeric keys. The display controller 42 displays a cancel button 68 for the input personal identification number and an OK button 69 that is operated when the input of the personal identification number is completed.

The input support system of the embodiment uses an IC card driver's license 65 as an example of the storage medium. The IC card driver's license 65 stores therein a four-digit first personal identification number and a four-digit second personal identification number. The input support system of the embodiment prompts only input of one of the personal identification numbers for user authentication. Input of both the first and second personal identification numbers may be prompted. When only input of the first personal identification number is prompted, a user authentication time can be reduced compared with a case when the input of both the first and second personal identification numbers is prompted. When input of both the first and second personal identification numbers is prompted, user authentication is strengthened, thereby improving safety.

The user operates the operating keys 66, thereby inputting the four-digit first personal identification number stored in the IC card driver's license 65 in advance and operates the OK button 69. The display controller 42 displays the personal identification number input by operating the operating keys 66 on an input display area 67. Specifically, the display controller 42 displays a numeral of the first digit of the personal identification number, and when inputting a numeral of the second digit, displays the numeral of the second digit with the numeral of the first digit changed to "•" or "*".

Figure 9:
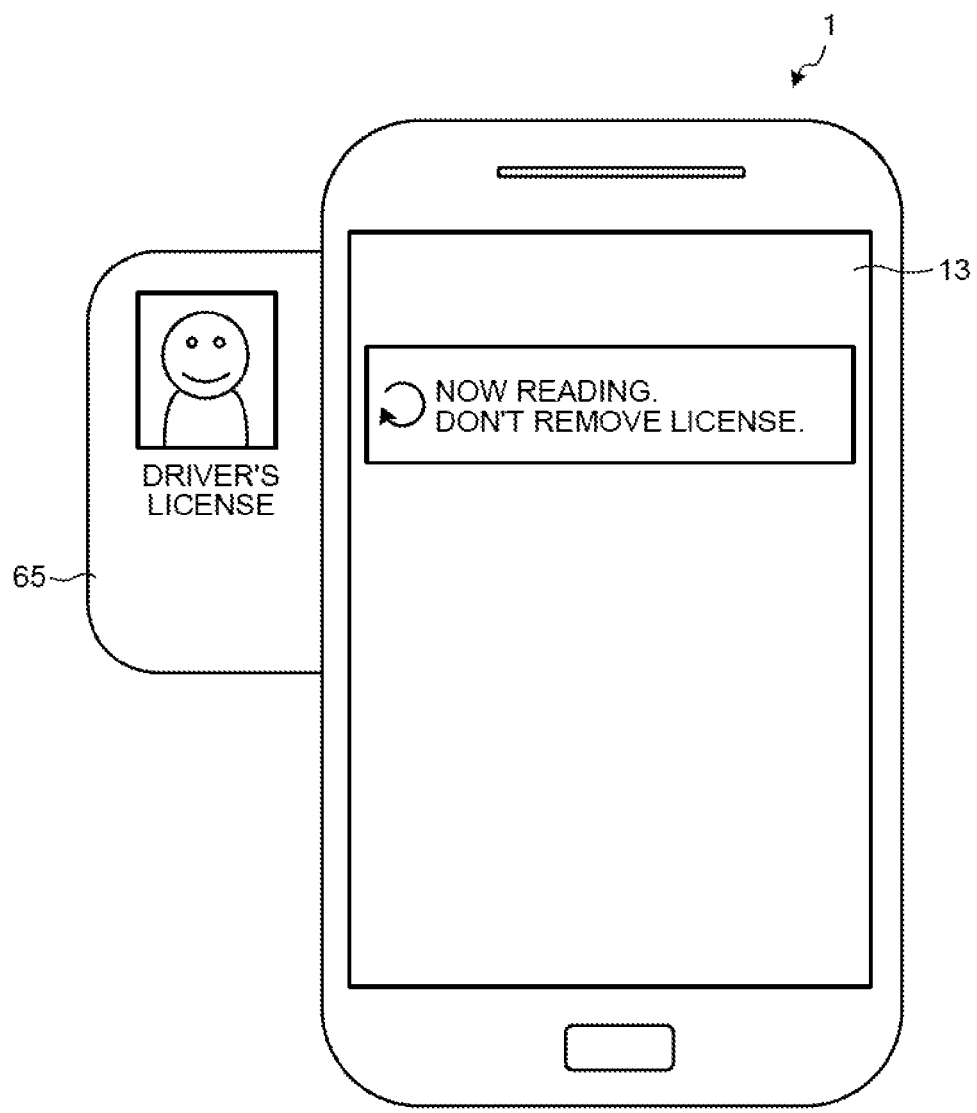
FIG. 9 is a diagram illustrating a screen while personal information stored in the user ID card is being acquired in the portable terminal apparatus provided in the input support system of the embodiment.

When the personal identification number is input and the OK button 69 is operated, as illustrated in FIG. 9, for example, the display controller 42 displays to the user a message indicating that the personal information is being read and a message maintaining a state in which the portable terminal apparatus 1 is brought into proximity to the IC card driver's license 65 such as "Now reading. Don't remove license." While these messages are displayed, at Step S8, the authenticating unit 46 compares the personal identification number input by the user to the first personal identification number acquired from the IC card driver's license 65 acquired through the near field wireless communication to perform user authentication processing.

If the personal identification number input by the user and the first personal identification number acquired from the IC card driver's license 65 do not match, the authenticating unit 46 determines that the user who has input the personal identification number via the operating keys 66 is an unauthorized user (No at Step S8) and ends the processing of the flowchart in FIG. 4 without any further operation. In contrast, if the personal identification number input by the user and the first personal identification number acquired from the IC card driver's license 65 match, the authenticating unit 46 authenticates the user who has input the personal identification number via the operating keys 66 as an authorized user (Yes at Step S8), and the process advances to Step S9.

Figure 10:
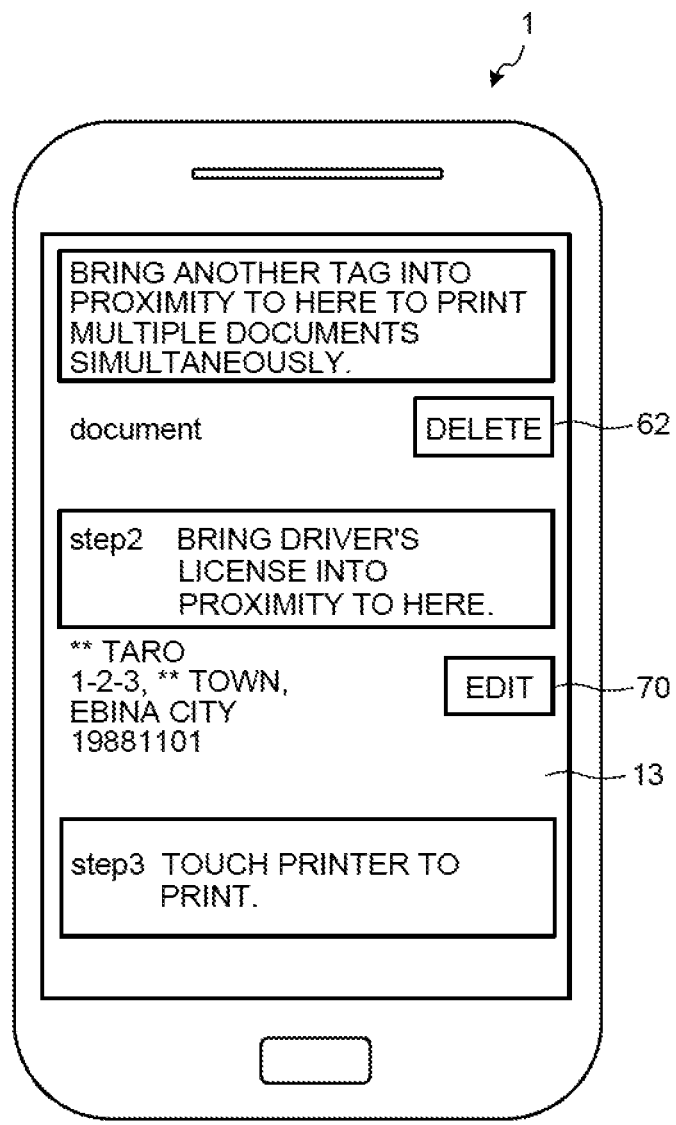
FIG. 10 is a diagram illustrating how the personal information acquired from the user ID card is displayed after user authentication in the portable terminal apparatus provided in the input support system of the embodiment.

At Step S9, the personal information acquisition unit 48 acquires the personal information stored in the IC card driver's license 65 through the near field wireless communication. At Step S10, the display controller 42 displays the acquired personal information on the display unit 13. FIG. 10 illustrates a display example of the personal information acquired from the IC card driver's license 65. This example is an example in which the personal information containing a full name of " Taro," an address of "1-2-3,  TOWN, EBINA CITY," and a date of birth of "Nov. 1, 1988 (19881101)" is acquired from the IC card driver's license 65 and is displayed on the display unit 13.

Although this example is an example of acquiring the personal information from the IC card driver's license 65, the input support system of the embodiment can also manually input the personal information. When the personal information is manually input, a manual input designation button 63 illustrated in FIG. 6 is operated. When the manual input designation button 63 is operated, the CPU 11 displays a text input screen on the display unit 13. The user performs operation of inputting the personal information via the text input screen. The CPU 11 displays the personal information input by the user on the display unit 13.

The display controller 42 displays an edit button 70 for instructing editing of the personal information together with the acquired personal information. The user operates the edit button 70 when correcting the address, for example. At Step S11, the CPU 11 monitors whether or not the operation on the edit button 70 has been made. If the edit button 70 is operated (Yes at Step S11), at Step S13, the CPU 11 moves to an edit mode, displays text input operating keys or the like, and corrects the personal information in accordance with input operation by the user. When the correction of the personal information is made, the CPU 11 returns the process to Step S10 and displays the corrected personal information.

Next, if the CPU 11 does not detect any manual input operation at Step S11 (No at Step S11), the process advances to Step S12. At Step S12, the storage controller 49 stores the document identification information acquired from the IC tag 61 and the personal information acquired from the IC card driver's license 65 in association with each other in the main storage unit 16, and the processing of the flowchart in FIG. 4 ends.

Figure 11:
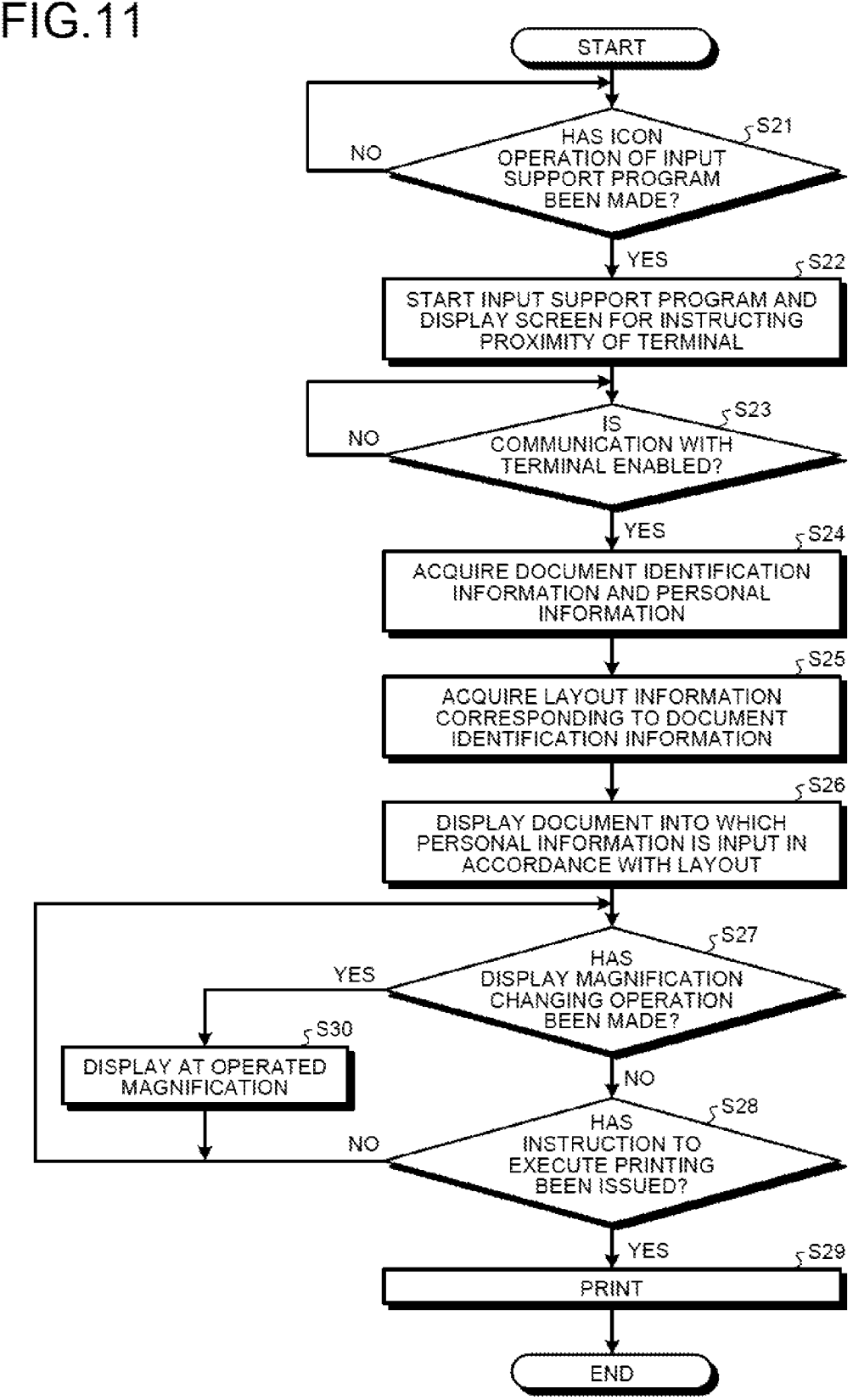
FIG. 11 is a flowchart for illustrating input support operation of the image forming apparatus provided in the input support system of the embodiment.

Next, the user transfers the document identification information and the personal information from the portable terminal apparatus 1 to the image forming apparatus 2 to obtain a document in which the personal information is input and printed. The flowchart in FIG. 11 illustrates a procedure of operation from the transfer of the document identification information and the personal information to the printing of the document in the image forming apparatus 2.

Figure 12:
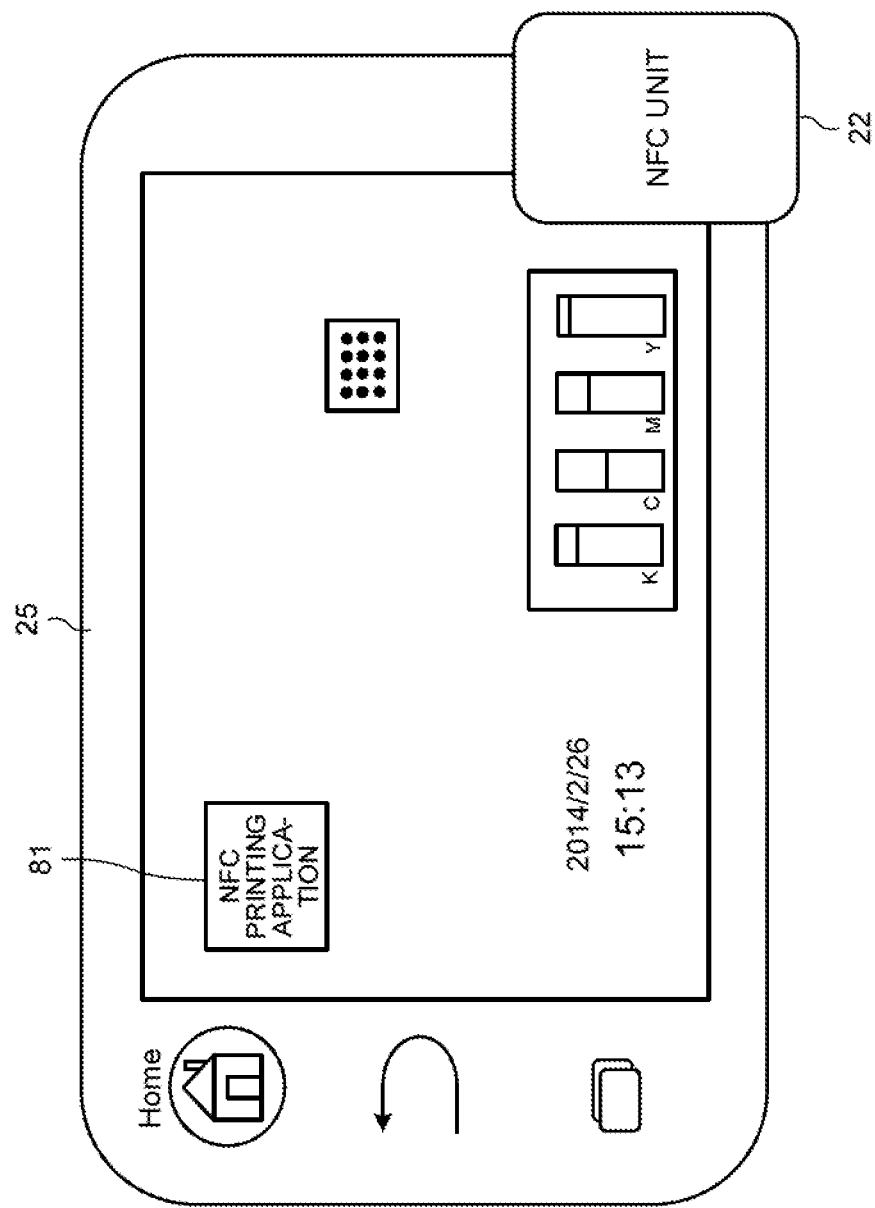
FIG. 12 is a diagram illustrating a standby screen of a panel provided in the image forming apparatus of the input support system of the embodiment.

FIG. 12 is a diagram illustrating an appearance of the panel 25 of the image forming apparatus 2. The NFC unit 22 is provided near the panel 25 in an externally attached manner. The example in FIG. 12 illustrates a standby screen of an operation standby state. When the document is printed, the user performs a touch operation on an icon (an icon of NFC printing application) 81 of the input support program displayed on the standby screen. At Step S21 of the flowchart in FIG. 11, the CPU 31 monitors whether or not the operation on the icon 81 of the input support program has been made. If the CPU 31 detects the operation on the icon 81 (Yes at Step S21), the process advances to Step S22.

At Step S22, the AP starting controller 51 reads the input support program for the image forming apparatus 2 from the auxiliary storage unit 35 and starts the program.

Figure 13:
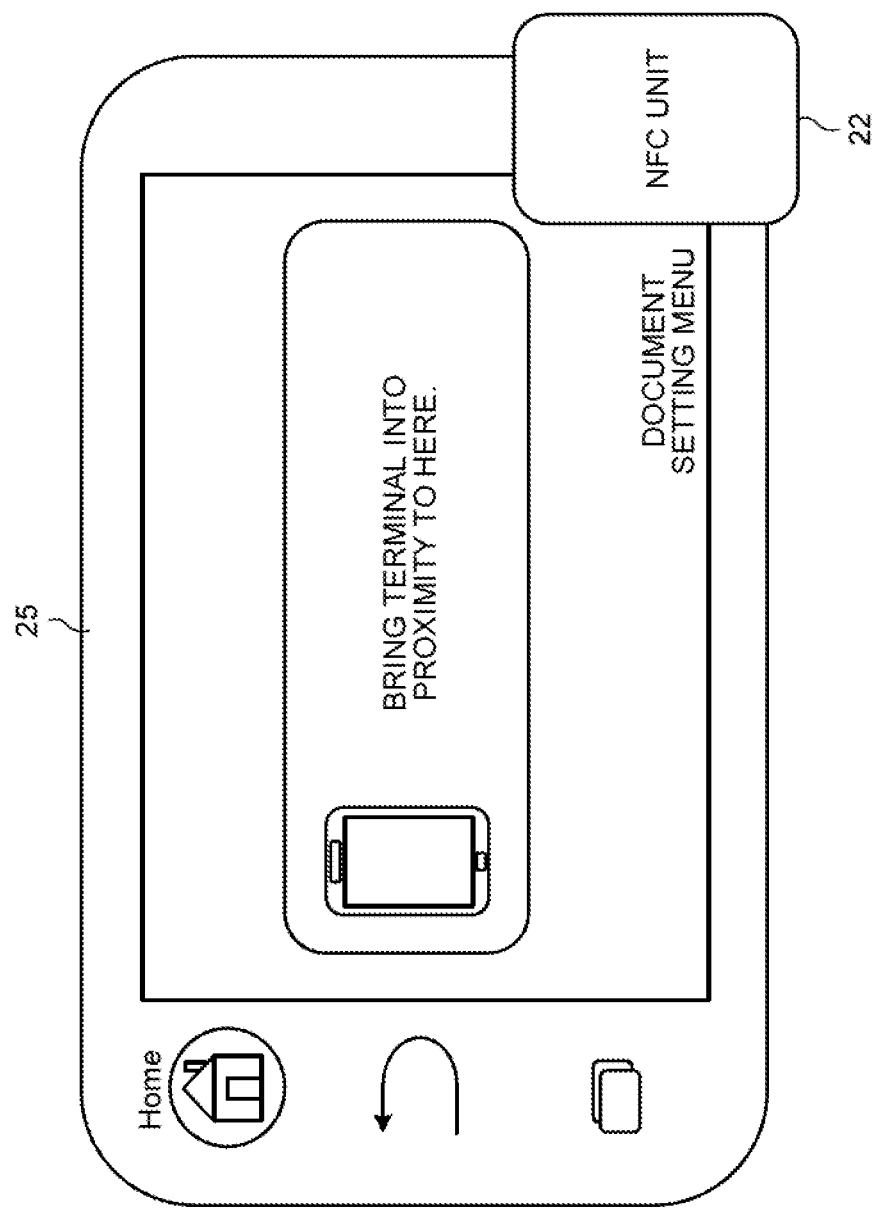
FIG. 13 is a diagram illustrating an initial screen when an input support program is started in the image forming apparatus of the input support system of the embodiment.

At Step S22, as illustrated in FIG. 13, the display controller 52 displays a message to prompt the proximity of the portable terminal apparatus 1 such as "Bring terminal into proximity to here" on the panel 25. The user sees this message and brings the portable terminal apparatus 1 into proximity to the NFC unit 22.

Next, at step S23, the NFC communication controller 53 attempts to establish a near field wireless communication line with the NFC unit 17 of the portable terminal apparatus 1. When the near field wireless communication line is established (Yes at Step S23), the process advances to Step S24.

At Step S24, the information acquisition unit 54 acquires the document identification information and the personal information stored in the portable terminal apparatus 1. At Step S25, the information acquisition unit 54 refers to the document database generated in the auxiliary storage unit 35 in advance using the acquired document identification information and acquires the layout information corresponding to the acquired document identification information.

Specifically, in this embodiment, the CPU 31 reads the document identification information stored in the IC tag 61 of the document via the NFC unit 22 and performs scan processing on the document using the scanner functionality of the image forming apparatus 2. When the document is scanned after the document identification information is acquired via the NFC unit 22, the CPU 31 generates a folder with a folder name composed of the year, month, day, hour, minute, and second at the scanning and the acquired document identification information in the auxiliary storage unit 35.

The CPU 31 accesses an external server apparatus via the network I/F 32 using the acquired document identification information and acquires the layout information (xy coordinates information) of the entry columns of the respective entries of the document indicated by the document identification information.

Figure 14:
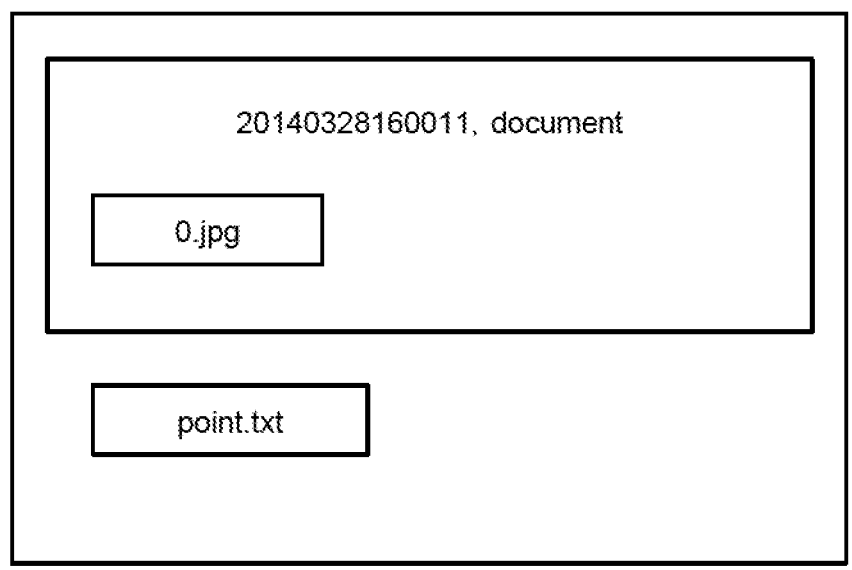
FIG. 14 is a diagram for illustrating a folder generated in a document database provided in the image forming apparatus of the input support system of the embodiment.

FIG. 14 is an example of the folder generated in the auxiliary storage unit 35. The example in FIG. 14 is an example of the folder generated by performing scan processing on a document with the document identification information of "document" at "16:00:11 on Mar. 28, 2014." In this case, the information acquisition unit 54 generates a folder with a folder name of "20140328160011, document" in the auxiliary storage unit 35. Use of scan date and time in generating the folder name can prevent folders having the same folder name in duplicate from being generated.

The CPU 31 stores image information of the scanned document and layout information acquired via the network in the folder. In the example illustrated in FIG. 14, "0.jpg" indicates the image information of the scanned document, whereas "point.txt" indicates the layout information of the scanned document. "jpg" means that the image information of the document is stored in a data form of "joint photographic experts group." "txt" means that the layout information is stored in a data form of text. These data forms are merely examples, and the image information of the scanned document and the layout information of the scanned document may be stored in other data forms.

The user thus performs acquisition of the document identification information and scan of the type for each document. This operation generates a plurality of folders storing the image information and the layout information for each document in the auxiliary storage unit 35, thereby constructing the document database. Although the user constructs the document database in this example, the image information and the layout information for each document may be downloaded to the auxiliary storage unit 35 from a certain server apparatus via a network. Alternatively, the image information and the layout information for each document stored in a storage medium may be stored in the auxiliary storage unit 35.

Next, at Step S26 of the flowchart in FIG. 11, the information combining unit 55 determines the entry positions of the respective entries on the document indicated by the image information using the layout information. The information combining unit 55 allocates the acquired personal information at the respective determined entry positions, thereby generating image information in which pieces of personal information are entered into respective corresponding entry positions. In other words, the information combining unit 55 superimposes (combines) the acquired pieces of personal information that have been aligned using the layout information on the image information of the document, thereby generating an image (a combined image)

of the document in which the corresponding pieces of personal information are entered into the respective entry positions. At Step S26, the display controller 52 displays the combined image on the panel 25.

Processing for generating such a combined image is described in more detail; that is, the information combining unit 55 generates the combined image as follows.

First, the information combining unit 55 checks whether or not a folder storing therein document data corresponding to the document identification information (a document ID) received by the NFC unit 22 of the image forming apparatus 2 is present within the document database of the auxiliary storage unit 35. If the folder is present within the document database, the information combining unit 55 reads the number of pages, the type of the information, and the respective coordinates of a rectangle of an entry column from the layout information (point.txt) stored in the folder.

The information combining unit 55 then checks whether or not the image information (document data: image information of the entire document) of the document corresponding to the number of pages acquired from the layout information is present within the folder. If the document data is present, the information combining unit 55 calculates a starting point of a combining position and a combining range from the respective coordinates of the rectangle of the entry column.

The information combining unit 55 then checks whether or not the personal information acquired via the NFC unit 22 of the image forming apparatus 2 is information of the type corresponding to the entry column indicated by the layout information. In other words, when the entry column indicated by the layout information is an entry column of address, it is checked whether or not the acquired personal information is information of address. When the entry column indicated by the layout information is an entry column of full name, it is checked whether or not the acquired personal information is information of full name.

When the personal information acquired via the NFC unit 22 of the image forming apparatus 2 is the information corresponding to the type corresponding to the entry column indicated by the layout information, the information combining unit 55 then combines the personal information with the image information of the document with a text size housed within the combining range calculated as described above to generate the combined image. The display controller 52 displays the thus generated combined image as a preview image on the panel 25.

Figure 15:
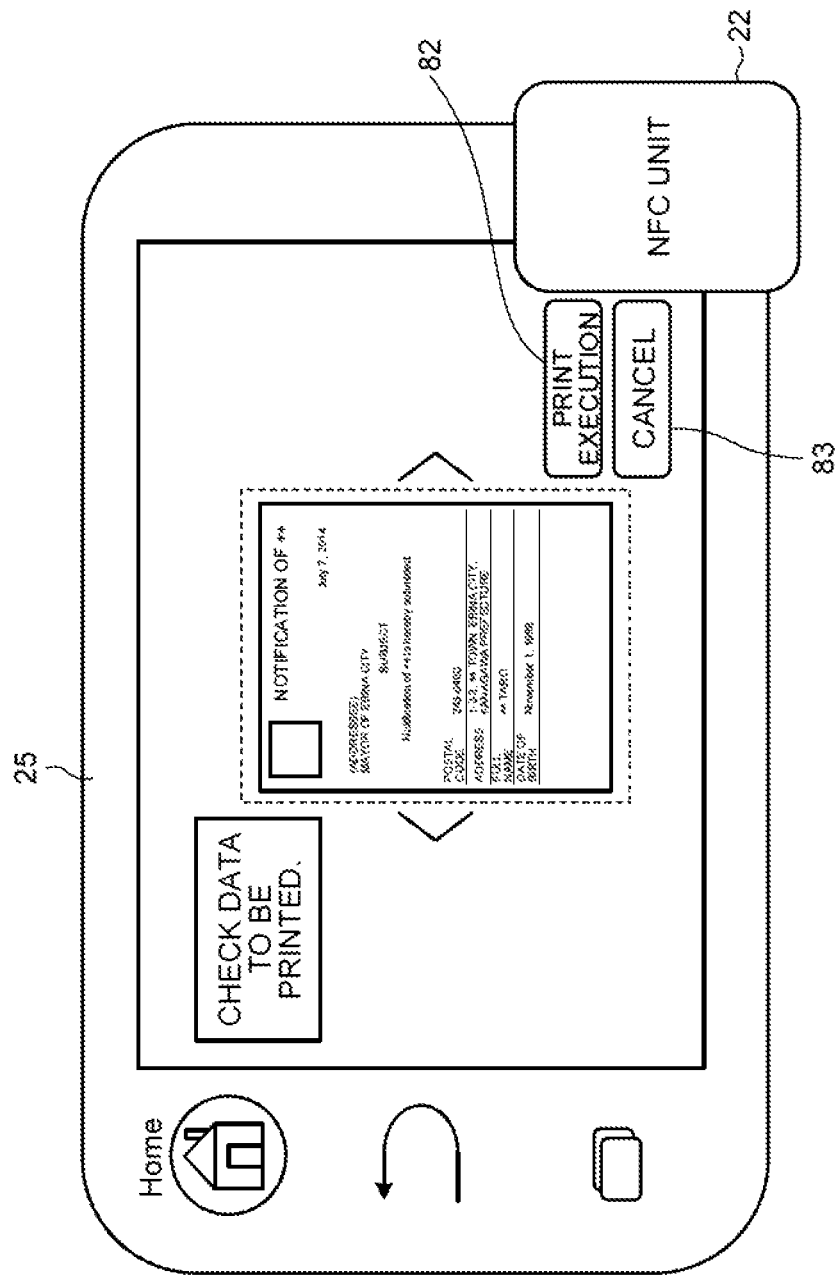
FIG. 15 is a diagram illustrating how the personal information acquired from the portable terminal apparatus is displayed on a document image in a combined manner in the image forming apparatus of the input support system of the embodiment.

FIG. 15 illustrates the panel 25 with the combined image (preview image) displayed. The display controller 52 displays the combined image in a reduced manner at the central part of the panel 25 as illustrated in FIG. 15, although that is an example. Through this combined image displayed in a reduced manner, the user determines whether the pieces of personal information are accurately entered into the respective entry positions on the document.

In this embodiment, the display magnification of the combined image can be operated changeably. Specifically, when the user performs an operation (a pinch out operation) to widen a gap between two fingers being in contact with the panel 25, the CPU 31 displays the combined image in an enlarged manner. When the user performs an operation (a pinch in operation) so as to reduce a gap between two fingers being in contact with the panel 25, the CPU 31 displays the combined image in a reduced manner.

At Step S27 of the flowchart in FIG. 11, the CPU 31 monitors whether or not such an operation to change the display magnification has been made. If the operation to change the display magnification is detected (Yes at Step S27), the process advances to Step S30, where the CPU 31 performs the above control so as to change the display magnification. The user determines whether or not the pieces of personal information are accurately entered into the respective entry positions on the document while changing the display magnification.

Figure 16:
FIG. 16 is a diagram illustrating a document in which the personal information is combined and printed in the image forming apparatus of the input support system of the embodiment.

The display controller 52 then displays, as illustrated in FIG. 15, together with the combined image, a print execution button 82 for instructing to execute the printing of the combined image and a cancel button 83 for instructing to cancel the printing of the combined image on the panel 25. The user confirms that the pieces of personal information are accurately entered into the respective entry positions on the document and operates the print execution button 82. At Step S28, the printing controller 56 monitors whether or not the operation on the print execution button 82 has been made. If the printing controller 56 detects the operation on the print execution button 82 at Step S28 (Yes at Step S28), the process advances to Step S29, and the printing controller 56 performs an instruction to print the combined image to the output apparatus 24. With this operation, the entire processing of the flowchart in FIG. 11 ends, and a document in which the entries are entered into the respective entry columns can be obtained via the output apparatus 24 as illustrated in FIG. 16, for example.

As is clear from the foregoing description, the input support system of the embodiment acquires the document identification information from the IC tag 61 of the document and acquires the personal information such as an address and a full name from the user ID card such as the IC card driver's license by the portable terminal apparatus 1. The document identification information and the personal information acquired by the portable terminal apparatus 1 are transmitted from the portable terminal apparatus 1 to the image forming apparatus 2 through the near field wireless communication.

The image forming apparatus 2 includes the document database that registers the pieces of document identification information, the entire images, and the layout information of the respective entry columns of the respective documents in association with each other. The image forming apparatus 2 searches for the entire image and the layout information of the respective entry columns of the document corresponding to the document identification information acquired from the portable terminal apparatus 1. The image forming apparatus 2 generates and prints the combined image in which the pieces of corresponding personal information are inserted into the positions of the respective entry columns indicated by the layout information on the entire image.

With this operation, a document in which pieces of corresponding personal information are automatically inserted into entry columns of respective entries of a desired document can be printed. The user only has to acquire the document identification information from the IC tag 61 of the document and acquire the personal information from the user ID card by the portable terminal apparatus 1 and transfer the document identification information and the personal information to the image forming apparatus 2, and the desired document can be created easily and in a short time. Consequently, the input support system of the embodiment can more efficiently create a document into which necessary information is input.

The embodiment of the present invention produces the advantageous effect of more efficiently creating a document into which necessary information is input.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising a first apparatus and a second apparatus,
the first apparatus comprising:
a first communication unit that performs near field wireless communication;
a document identification information acquisition unit that acquires, via the first communication unit, document identification information for identifying a document, from a storage device of an integrated circuit (IC) tag that is attached to the document and that is configured to perform near field wireless communication;
a personal information acquisition unit that acquires, via the first communication unit, personal information stored in a storage medium of an integrated circuit (IC) card that is configured to perform near field wireless communication; and
a first communication controller that controls the first communication unit so as to transmit the document identification information and the personal information in association with each other, and
the second apparatus comprising:
a second communication unit that performs near field wireless communication with the first communication unit of the first apparatus;
a second communication controller that controls the second communication unit so as to receive the document identification information and the personal information which are associated with each other and were transmitted from the first apparatus;
a storage unit that stores therein document identification information for identifying a document, document image information, and entry position information of entries in association with each other for each document,
an information combining unit that searches the storage unit for the document image information and the entry position information stored in association with the same document identification information as the received document identification information and generates a combined image in which the received personal information is combined at a position on a document image indicated by the entry position information,
a printing unit to print the combined image, upon command, and
a display unit to display a preview of the combined image,
wherein in the combined image that is to be printed, the received personal information is combined at the position on the document image indicated by the entry position information.

2. The information processing system according to claim 1, wherein
the IC card stores therein a personal identification number, and
the personal information acquisition unit requests input of a personal identification number when the personal information is acquired and acquires the personal information when the input personal identification number and the personal identification number stored in the IC card match.

3. The information processing system according to claim 1, wherein the personal information stored in the storage medium and in association with the document identification information is personal information of a user associated with the storage medium.

4. An image forming apparatus comprising:
a communication unit that performs near field wireless communication;
a communication controller that controls the communication unit so as to receive (i) document identification information for identifying a document and obtained from a storage device of an integrated circuit (IC) tag that is attached to the document and that is configured to perform near field wireless communication, and (ii) personal information to be input to the document and obtained from a storage medium of an integrated circuit (IC) card that is configured to perform near field wireless communication, the document identification information and the personal information being transmitted from a terminal apparatus through near field wireless communication, the document identification information and the personal information being associated with each other;
a storage unit that stores therein document identification information for identifying a document, document image information, and entry position information of entries in association with each other for each document; and
an information combining unit that searches the storage unit for the document image information and the entry position information stored in association with the same document identification information as the received document identification information and generates a combined image in which the received personal information is combined at a position on a document image indicated by the entry position information,
a printing unit to print the combined image, upon command; and
a display unit to display a preview of the combined image,
wherein in the combined image that is to be printed, the received personal information is combined at the position on the document image indicated by the entry position information.

5. The image forming apparatus according to claim 4, wherein
the terminal apparatus comprises;
a communication unit that performs near field wireless communication;
a document identification information acquisition unit that acquires document identification information for identifying a document via the communication unit of the terminal apparatus;
a personal information acquisition unit that acquires personal information stored in a storage medium via the communication unit of the terminal apparatus; and
a communication controller that controls the communication unit of the terminal apparatus so as to transmit the document identification information and the personal information in association with each other,
wherein
the document identification information acquisition unit acquires the document identification information by causing the communication unit of the terminal apparatus to perform near field wireless communication with the IC tag attached to the document, the personal information acquisition unit acquires the personal information by causing the communication unit of the terminal apparatus to perform near field wireless communication with the IC card, and the communication unit of the image forming apparatus performs near field wireless communication with the communication unit of the terminal apparatus and receives the document identification information and the personal information transmitted from the terminal apparatus.

6. The image forming apparatus according to claim 5, wherein the IC card stores therein a personal identification number, and the personal information acquisition unit requests input of a personal identification number when the personal information is acquired and acquires the personal information when the input personal identification number and the personal identification number stored in the IC card match.

7. A computer program product comprising a non-transitory computer-readable recording medium having an information processing program that causes a computer to function as:

a communication controller that controls a communication unit that performs near field wireless communication so as to receive (i) document identification information for identifying a document and obtained from a storage device of an integrated circuit (IC) tag that is attached to the document and that is configured to perform near field wireless communication, and (ii) and personal information to be input to the document, which is stored in a storage medium of an integrated circuit (IC) card that is configured to perform near field wireless communication, the document identification information and the personal information being transmitted from a terminal apparatus through near field wireless communication, the document identification information and the personal information being associated with each other; and an information combining unit that, by referring to a storage unit that stores therein document identification information for identifying a document, document image information, and entry position information of entries in association with each other for each document with the received document identification information, searches for the document image information and the entry position information stored in association with the same document identification information as the received document identification information and generates a combined image in which the received personal information is combined at a position on a document image indicated by the entry position information, a printing controller that controls a printing unit to print the combined image, upon command, and causes to be displayed on a display of the computer a preview of the combined image, wherein in the combined image that is to be printed, the received personal information is combined at the position on the document image indicated by the entry position information.

8. The computer program product according to claim 7, wherein the IC card stores therein the personal identification number, and the terminal apparatus requests input of the personal identification number when the personal information is acquired and acquires the personal information when the input personal identification number and the personal identification number stored in the IC card match.

* * * * *